United States Patent
An et al.

(10) Patent No.: US 7,512,428 B2
(45) Date of Patent: Mar. 31, 2009

(54) TWIST-TYPE MOBILE TERMINAL AND HINGE DEVICE THEREOF

(75) Inventors: Ki-Chul An, Ichon-shi (KR);
Byoung-Gon Lee, Ichon-shi (KR);
Do-Sung Park, Ichon-shi (KR)

(73) Assignee: Pantech & Curitel Communications, Inc., Seoul (KR)

( * ) Notice: Subject to any disclaimer, the term of this patent is extended or adjusted under 35 U.S.C. 154(b) by 1101 days.

(21) Appl. No.: 10/793,516

(22) Filed: Mar. 3, 2004

(65) Prior Publication Data

US 2005/0064919 A1    Mar. 24, 2005

(30) Foreign Application Priority Data

Sep. 19, 2003    (KR)    .................. 10-2003-0065304

(51) Int. Cl.
*H04M 1/00*    (2006.01)
*G06F 1/16*    (2006.01)
(52) U.S. Cl. .................. 455/575.3; 455/575.1; 455/566
(58) Field of Classification Search .............. 455/575.3, 455/575.1, 566, 351, 550.1, 556.1, 556.2, 455/347; 379/433.11, 433.13; 312/271; 361/679, 683
See application file for complete search history.

(56) References Cited

U.S. PATENT DOCUMENTS

| 4,773,766 | A | * | 9/1988 | Nagasaka et al. ............ 374/124 |
| 7,245,948 | B2 | * | 7/2007 | Jung et al. ................ 455/575.1 |

FOREIGN PATENT DOCUMENTS

| GB | 2387063 A | * | 10/2003 |
| KR | 20020049809 | * | 6/2002 |
| KR | 1020020049809 A | | 6/2002 |
| KR | 319752 | | 7/2003 |
| KR | 200319752 | * | 7/2003 |
| KR | 1020040060308 | | 7/2004 |

* cited by examiner

*Primary Examiner*—Melur Ramakrishnaiah
(74) *Attorney, Agent, or Firm*—H.C. Park & Associates, PLC

(57) ABSTRACT

A twist-type mobile terminal includes a lower housing portion having a key pad; an upper housing portion having a display unit; and a hinge device for twist-rotating the upper housing portion while the lower housing portion and upper housing portion are folded and unfolded.

6 Claims, 6 Drawing Sheets

TWIST-TYPE MOBILE TERMINAL AND HINGE DEVICE THEREOF

FIELD OF THE INVENTION

The present invention relates to a foldable mobile terminal; and, more particularly, to a twist-type mobile terminal and a hinge device of the same which twist-rotate an upper housing portion during an opening or closing operation.

DESCRIPTION OF THE PRIOR ART

Generally, a foldable mobile terminal includes a lower housing portion having a keypad and an upper housing portion having a display unit. The lower housing portion and the upper housing portion are connected with each other by a hinge device. The upper housing portion and the lower housing portion are folded and unfolded by hinge mechanism of the hinge device. That is, the first housing portion and the second housing portion are folded in a clamshell fashion by rotating one of the lower housing portion and the upper housing portion about a first axis.

In a rotary-type foldable mobile terminal, the lower and upper housing portions are coupled by a swivel hinge device. By the swivel hinge device, the two housing portions can be rotated about a first axis for folding or unfolding two housing portions as a closing operation or an opening operation, respectively and the upper housing portion can be swiveled about a second axis perpendicular to the first axis.

Hereinafter, a conventional rotary-type foldable mobile terminal is described with reference to the attached drawings.

FIG. 6 is a side view illustrating a conventional rotary-type foldable mobile terminal, and FIG. 7 is a sectional view illustrating a hinge device of the conventional rotary-type foldable mobile terminal.

Referring to FIGS. 6 and 7, the conventional rotary-type foldable mobile terminal includes a lower housing portion 100, an upper housing portion 300 and a swivel hinge device 200. The lower housing portion 100 includes a key pad and the upper housing portion 300 includes a display unit. The swivel hinge device 200 includes a vertical shaft 310 and a horizontal shaft 210.

The lower housing portion 100 and the upper housing portion 300 are coupled end to end by the swivel hinge device 200. The swivel hinge device 200 allows the lower housing portion 100 and upper housing portion 300 to rotate about the horizontal shaft 210 such that the two housings can be folded and unfolded as an opening operation and a closing operation respectively. That is, the conventional rotary-type foldable mobile terminal can be folded by rotating one of the lower housing portion and upper housing portion about the horizontal shaft 210. Furthermore, the swivel hinge device allows the lower housing portion and upper housing portion to rotate about the vertical shaft 310 perpendicular to the horizontal shaft 210.

In the conventional rotary-type mobile terminal, there is no relation between an operation of folding the upper housing portion and the lower housing portion with respect to the horizontal shaft 210 and an operation of rotating the upper housing portion and the lower housing portion about the vertical shaft 310.

Accordingly, the display unit of the upper housing portion 300 of the conventional rotary-type mobile terminal is hided inside of folded two housing portions in a closed state. For viewing data on the display unit in the closed state, a user must perform a swivel operation to rotate the upper housing portion about the vertical shaft in an opened state, which is a state that two housing portions are unfolded, and then perform a rotating operation to rotate one of the upper housing potion and the lower housing portion about the horizontal shaft.

That is, for viewing the data on the display unit in the closed state, the user must perform several steps of operations such as unfolding the two housing portions, rotating the upper housing portion about the vertical shaft and folding the two housing portions.

Furthermore, the conventional rotary-type foldable mobile terminal additionally requires an auxiliary display unit arranged on an opposite side of the main display unit of the upper housing portion like a general foldable mobile terminal, leading to a high manufacturing cost.

SUMMARY OF THE INVENTION

It is, therefore, an object of the present invention to provide a twist-type mobile terminal and a hinge device of the same which twist-rotate an upper housing portion during an opening or closing operation.

For a twist-rotation operation, an upper housing portion rotates about a horizontal shaft and then rotates about a vertical shaft by a rotation force generated by a rotation of the upper housing portion about a horizontal shaft.

In accordance with one aspect of the present invention, there is provided a twist-type mobile terminal, including: a lower housing portion having a key pad; an upper housing portion having a display unit; and a hinge device for twist-rotating the upper housing portion while the lower housing portion and upper housing portion are folded and unfolded.

In accordance with another aspect of the present invention, there is provided a twist-type mobile terminal, including: a lower housing portion having a key pad; an upper housing portion having a display unit; and a hinge device having a first bevel gear fixed to an upper end part of the lower housing portion, and a second bevel gear fixed to a lower end part of the upper housing portion, wherein the first and second bevel gears are engaged with each other to twist-rotate the upper housing portion while the upper housing portion is opened or closed.

In accordance with further another aspect of the present invention, there is provided a twist-type mobile terminal, including: a first body; a second body foldable and unfoldable with respect to the first body; and a hinge device having a first hinge for rotating the first body about a horizontal shaft and a second hinge for rotating the first body about a vertical shaft, wherein the second hinge horizontally rotates the first body while the first hinge vertically rotates the first body.

In accordance with further still another aspect of the present invention, there is provided a hinge device for opening and closing a mobile communication terminal having first and second bodies, the second body openable and closable with respect to the first body, the hinge device including: a first hinge coupled to the first body and rotating the second body on a horizontal shaft; and a second hinge rotating the second body on a vertical shaft, wherein the second hinge twist-rotates the second body by a rotational force generated by the first hinge.

In accordance with further still another aspect of the present invention, there is provided a hinge device for a mobile communication terminal having first and second bodies, the second body openable and closable with respect to the first body, the hinge device including: a first gear fixed to the first body; and a second gear fixed to the second body and engaged with the first bevel gear, wherein the first and second gears have a gear ratio such that the second body is rotated at a predetermined angle with respect to the first body.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings.

Figure 1:
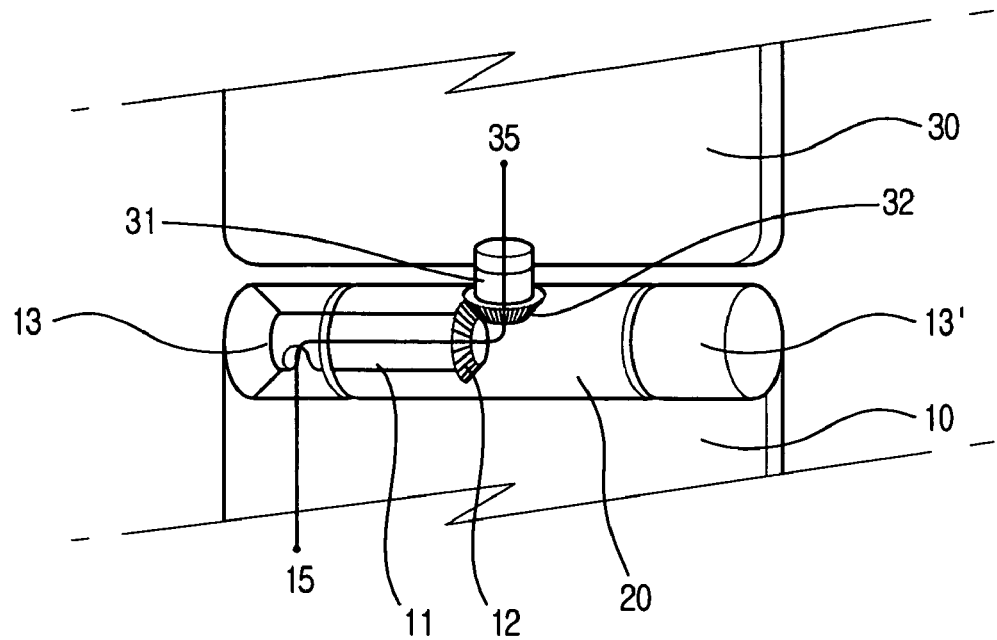
FIG. 1 is a perspective view illustrating a two-shaft hinge device of a twist-type mobile terminal in accordance with an embodiment of the present invention.
Figure 2:
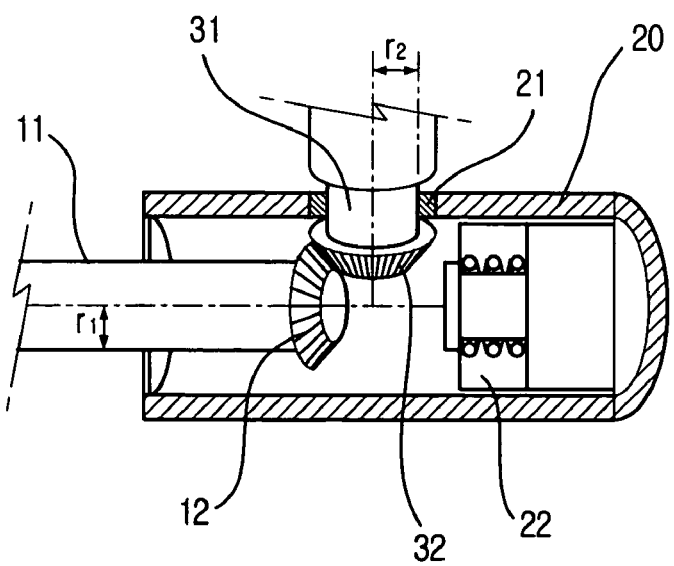
FIG. 2 is a detailed view of the two-shaft hinge device of FIG. 1.

FIG. 1 is a perspective view illustrating a two-shaft hinge device of a twist-type mobile terminal in accordance with an embodiment of the present invention. FIG. 2 is a detailed view of the two-shaft hinge device of FIG. 1.

As shown, the twist-type mobile terminal includes a lower housing portion 10, a two-shaft hinge device 20 and an upper housing portion 30. The lower housing portion 10 includes two hinge housing portions 13 and 13' formed at each corner at upper portion of the lower housing portion 10. The lower housing portion 10 and the upper housing portion 30 are connected by the two-shaft hinge device 20. The two-shaft hinge device 20 includes a horizontal shaft 11 and a vertical shaft 31.

The two-shaft hinge device 20 provides not only rotation mechanism allowing the upper housing portion and the lower housing portion to be rotated about a vertical shaft for folding the upper housing portion and lower housing portion together but also twist-rotation mechanism allowing the upper housing portion to be rotated about the horizontal shaft while the upper housing portion and the lower housing portion are folded or unfolded.

The horizontal shaft 11 includes one end fixed at the hinge housing portion 13 and the other end having a first bevel gear 12. The vertical shaft 31 includes one end fixed to a lower end part of the upper housing portion 30 and the other end having a second bevel gear 32. The first bevel gear 12 is perpendicularly engaged to the second bevel gear 32. The first bevel gear 12 and the second bevel gear 32 have a gear ratio for allowing the second bevel gear 32 to rotate preferably about 180 degrees within a rotation range of the two-shaft hinge device 20 to fold or unfold the upper housing portion 30 and the lower housing portion 10 together thereby providing a twist-rotation operation.

For example, in the case that, the first bevel gear 12 and the second bevel gear 32 have a gear ratio of about 180:150, the upper housing portion rotates in an angle of 180 degrees when one of the upper and lower housing portions 30 and 10 is rotated in an angle of 150 degrees about the horizontal shaft 11. In other words, the upper housing portion 30 can be rotated at an angle of 180 degrees about the vertical shaft 31 while the lower housing portion 10 is rotated in an angle of 150 degrees about the horizontal shaft 11.

The first bevel gear 12 may include partially formed teeth only within the rotation range of the two-shaft hinge device 20 for engaging the first bevel gear 12 with the second bevel gear 32 after the folded upper housing portion 30 and the lower housing portion 10 are unfolded in a predetermined angle.

Preferably, a hollow shaft is used as the horizontal shaft 11 and the vertical shaft 31. The horizontal shaft 11 and the vertical shaft 31 have empty space thereinside in order to connect a flexible printed circuit (FPC) through the inside hollow parts from a display unit 35 of the upper housing portion 30 to a main printed circuit board (PCB) 15 arranged on the lower housing portion 10.

As shown in FIG. 2, a radius r1 of the first bevel gear 12 and a radius r2 of the second bevel gear 32 are determined by the same manner way as the gear ratio. For example, a ratio r1:r2 of the radius r1 and the radius r2 is determined to be about 180:150 or 180:120, depending on an angular range that the second bevel gear 32 is engaged with the first bevel gear 12 to rotate 180 degrees.

Preferably, a bearing or ring 21 is arranged at a contact portion between the two-shaft hinge device 20 and the upper housing portion 30, thereby reducing abrasion and friction occurred therebetween.

The two-shaft hinge device 20 further includes a hinge member 22 coupled to the hinge housing portion 13'. The hinge member 22 is well known to the ordinary one skilled and thus detailed description on that is omitted. That is, the hinge member 22 provides an elastic force for folding/unfolding the lower housing portion 10 and the upper housing portion 30, and for rotating the upper housing portion 30 about the vertical shaft 31. The hinge member 22 includes a central shaft, a first cam, a second cam and an elastic unit.

Figure 3:
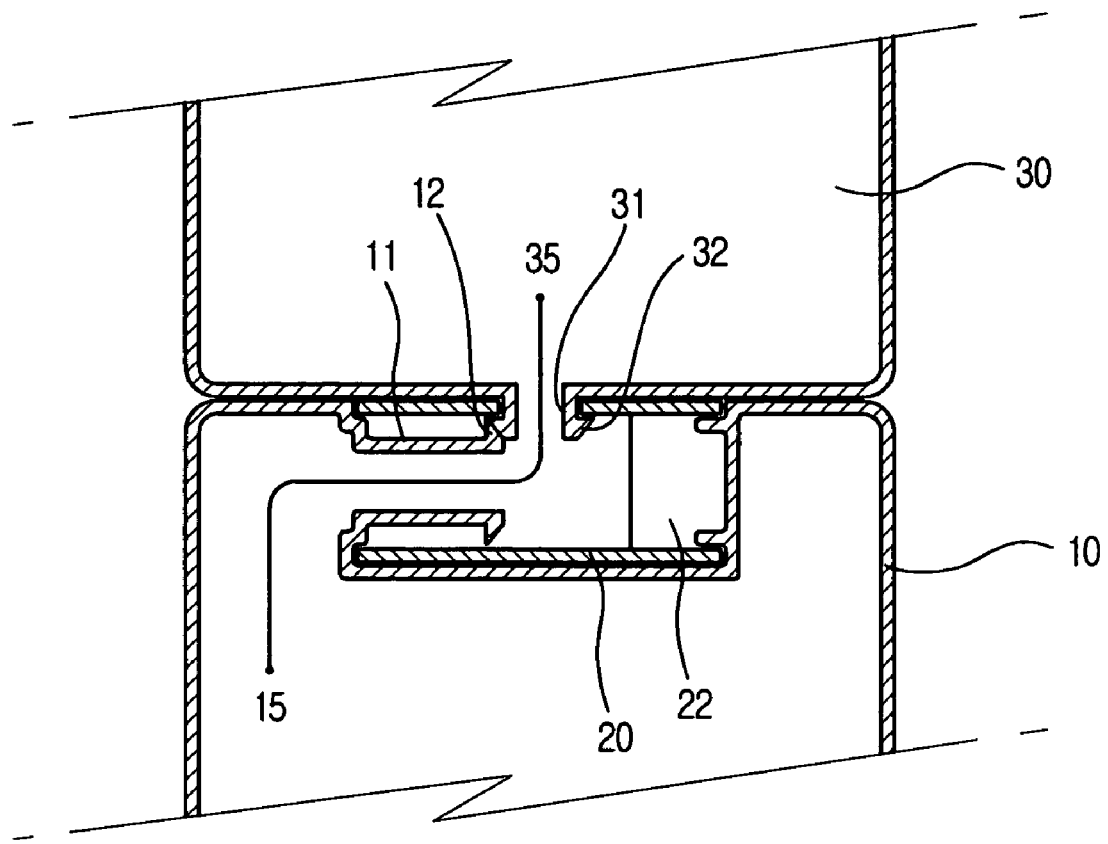
FIG. 3 is a sectional view illustrating the two-shaft hinge device of the present invention.

FIG. 3 is a sectional view illustrating the two-shaft hinge device of the present invention.

As described above, the hollow shaft is used as the horizontal shaft 11 and the first bevel gear 12. The vertical shaft 31 and the second bevel gear 32 allows the flexible printed circuit (FPC) to be connected from the main printed circuit board (PCB) 15 to the display unit 35 through the inside hole of the horizontal shaft 11 and the first bevel gear 12.

Figure 4A:
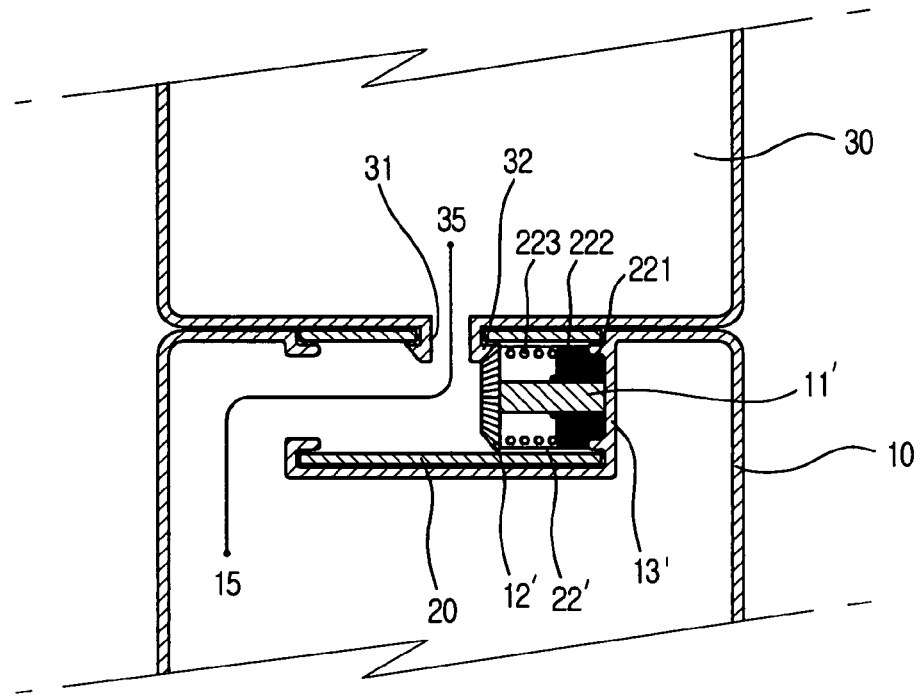
FIG. 4A is a sectional view illustrating a two-shaft hinge device in accordance with another embodiment of the present invention.

FIG. 4A is a sectional view illustrating a two-shaft hinge device in accordance with another embodiment of the present invention.

As shown, a first bevel gear 12' is integrated with a hinge member 22'. The hinge member 22 is well known to the ordinary one skilled.

The hinge member 22' includes a horizontal shaft 11' having one end coupled to the first bevel gear 12'; a first cam 221 into which the other end of the horizontal shaft 11' is inserted so that the first cam 221 and the other end of the horizontal shaft 11' are inserted into and fixed to the hinge housing portion 13' of the lower housing portion 10; a second cam 222 being engaged with the first cam 221, rotating about the horizontal shaft 11' together with the two-shaft hinge device 20, and straightly moving in a longitudinal direction of the horizontal shaft 11' by a mutual cam operation with the first cam 221; and an elastic unit 223 for providing a restoring force with respect to the straight movement of the second cam 222.

The elastic unit 223 is supported by the horizontal shaft 11' and the first bevel gear 12'. The elastic unit 223 is made of a material for providing a restoring force against a straight displacement of the second cam 22 such as a coiled spring.

The second cam 222 is arranged in a specific manner to perform the straight movement and rotate together with a two-shaft hinge device 20. Thus, when the elastic unit 223 presses the second cam 222, the second cam 222 rotates by a mutual cam operation with the first cam 221, so that the two shaft hinge device 20 also rotates together with the second cam 222. This operation allows the upper housing portion 30 to be smoothly opened and closed by the restoring force of the elastic unit 223.

Figure 4B:
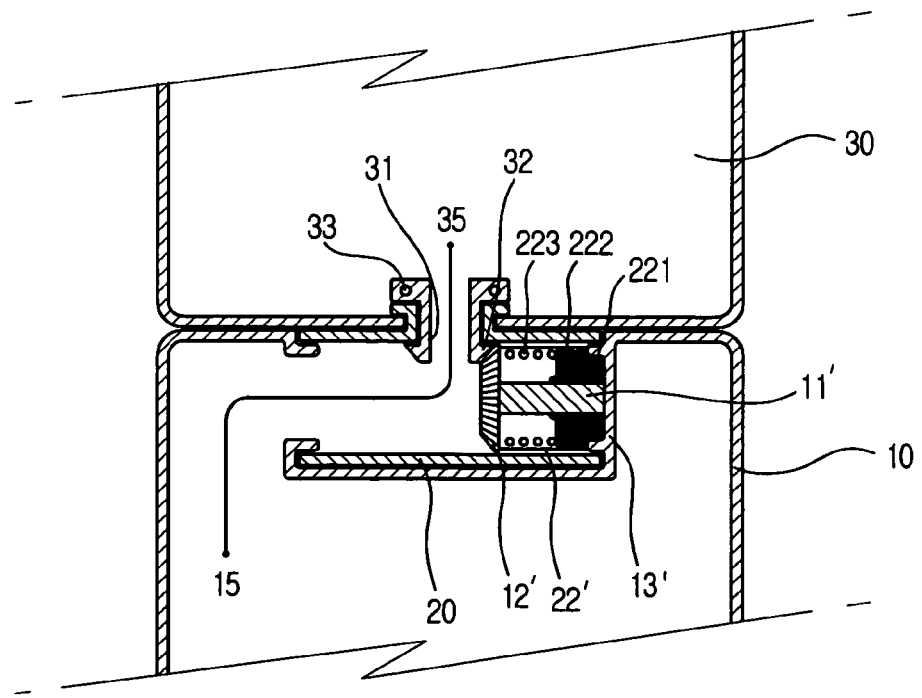
FIG. 4B is a sectional view illustrating a modified vertical shaft in accordance with the present invention.

FIG. 4B is a sectional view illustrating a modified vertical shaft in accordance with the present invention.

The modified vertical shaft 31 having a second bevel gear can be formed not only as an extension of the upper housing portion 30 as shown in FIG. 3 and FIG. 4A, but also as a separate member as shown in FIG. 4B. However, they should be fixed to the upper housing portion 30 by a fixing unit 33.

In FIGS. 4A and 4B, a flexible printed circuit (FPC) can pass through a space facing to the first bevel gear 12' to connect a main PCB 15 with a display part 35.

FIGS. 5A to 5D are views illustrating an opening operation of the twist-type mobile terminal in accordance with the present invention.

Figure 5A:
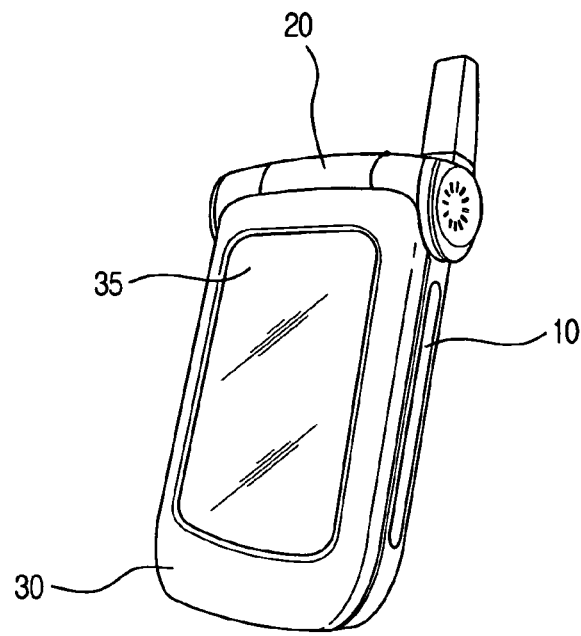
FIGS. 5A to 5D are views illustrating an opening operation of the twist-type mobile terminal in accordance with the present invention.
Figure 5B:
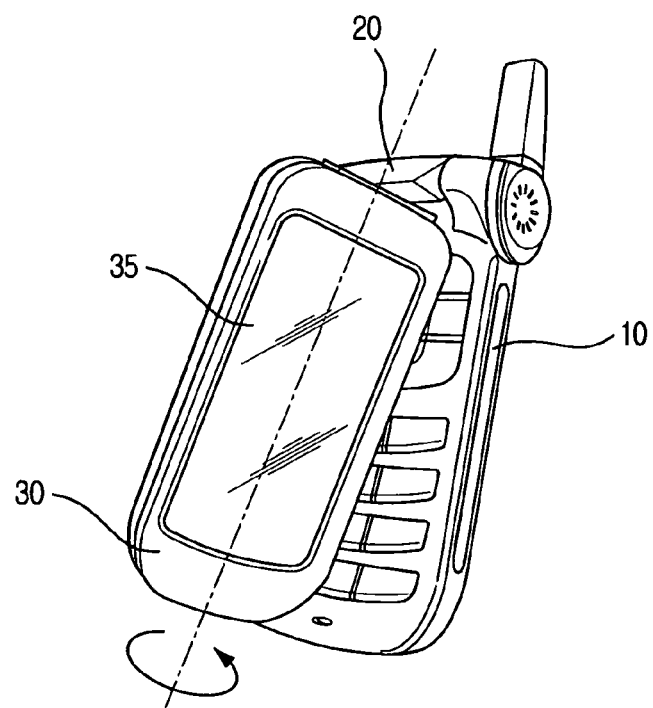
Figure 5C:
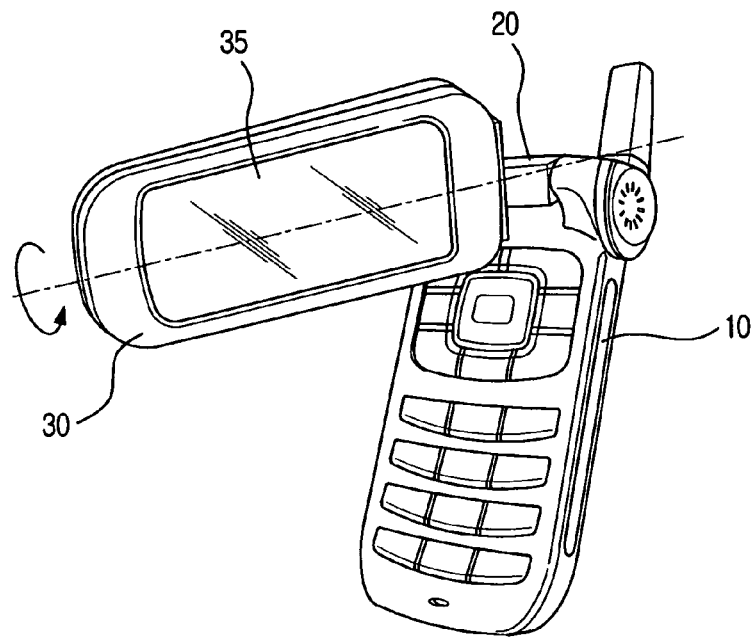
Figure 5D:
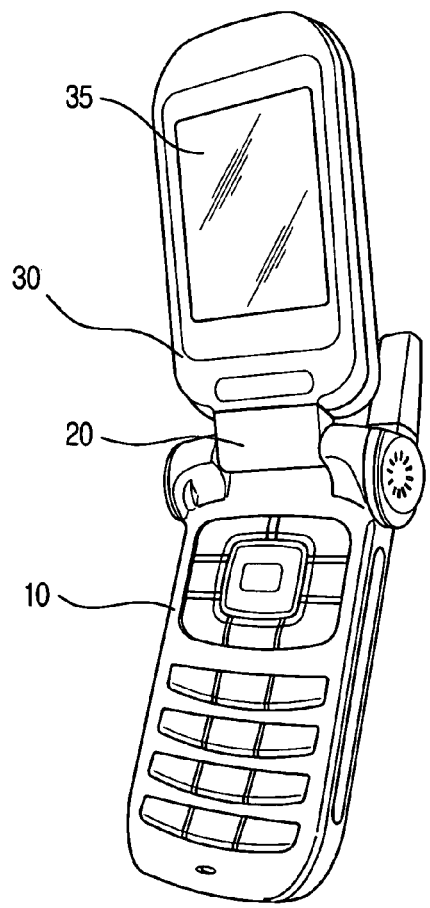
Figure 6:
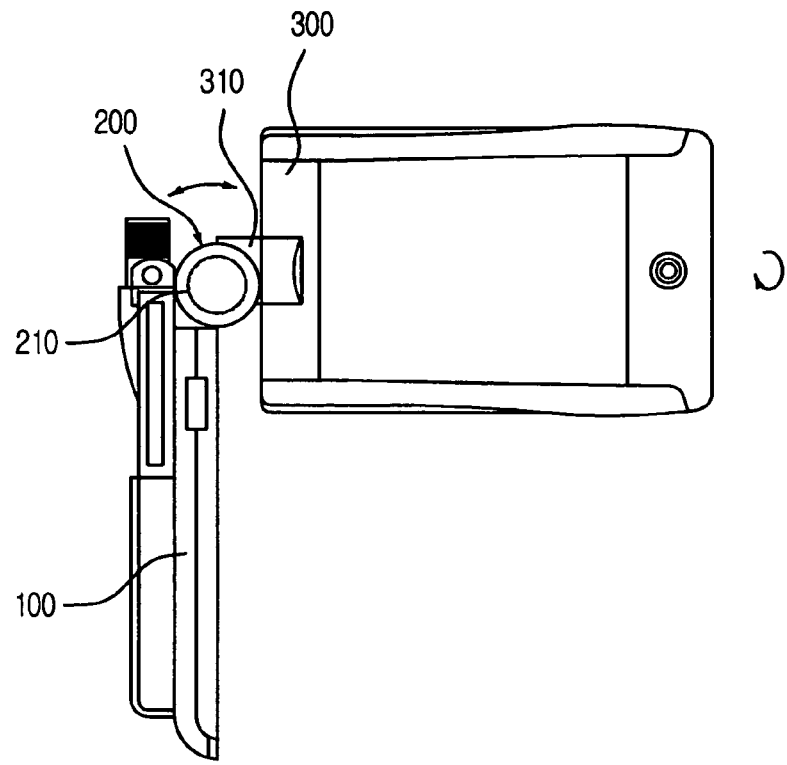
FIG. 6 is a side view illustrating a conventional rotary-type foldable mobile terminal.
Figure 7:
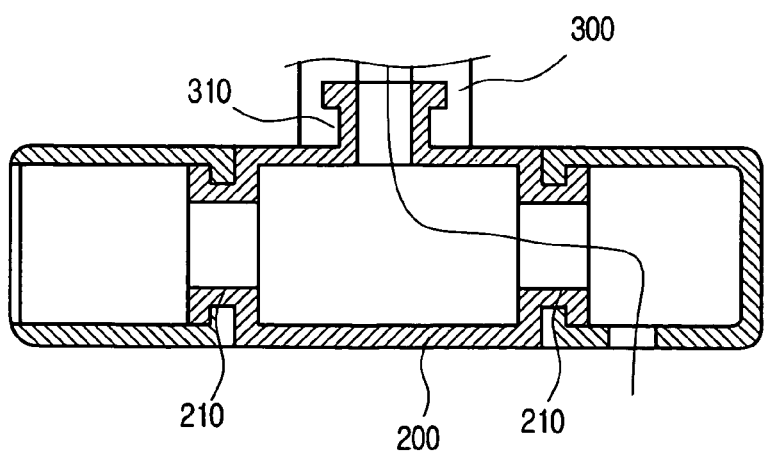
FIG. 7 is a sectional view illustrating a hinge device of the conventional rotary-type foldable mobile terminal.

A display unit 35 directs toward to a user's viewpoint in a closed state of the upper housing portion as shown in FIG. 5A. For unfolding the upper housing portion 30 and the lower housing portion 10, a user lifts the upper housing portion 30 up to a predetermined angle, the hinge member 22 or 22' receives this lifting force rotates the upper housing portion 30 about the vertical shaft 11 or 11'. At this time, the second bevel gear 32 of the vertical shaft 31 begins to get engaged with the first bevel gear 12 of the horizontal shaft 11 or 11'. As a result, the upper housing portion 30 coupled to the vertical shaft 31 having the second bevel gear 32 makes an automatic rotation of about 180 degrees about the vertical shaft 31 until the upper housing portion is lifted up within a vertical rotation angle of the horizontal shaft 11 or 11'. Accordingly, the two-shaft hinge device performs a twist-rotation operation. As a result, the display unit 35 gets directed toward a user's view point even in an opened state of the upper housing portion in FIG. 5D Also, a closing operation is performed in a reverse order.

As described herein before, in the twist-type mobile terminal of the present invention, the display unit directs toward a user's view point in both opened or closed states since the upper housing portion twist-rotates in an angle of about 180 degrees during opening or closing of the upper housing portion. Thus, there is no need for an auxiliary display unit, leading to a low manufacturing cost. Furthermore, the twist-type mobile terminal is very convenient for a user due to a fact that the opening and closing operations can be switched by one-time operation while the display part still directs toward a user's view point in both of the opened and closed states.

While the present invention has been described with respect to the particular embodiments, it will be apparent to those skilled in the art that various changes and modifications may be made without departing from the scope of the invention as defined in the following claims.

What is claimed is:

1. A twist-type mobile terminal, comprising:
a lower housing portion having a key pad;
an upper housing portion having a display unit; and
a hinge device having a first bevel gear fixed to an upper end part of the lower housing portion, and a second bevel gear fixed to a lower end part of the upper housing portion,
wherein the first and second bevel gears are engaged with each other to twist-rotate the upper housing portion while the upper housing portion is opened or closed;
wherein the hinge device further comprises a hinge member which provides an elastic force for folding/unfolding the lower housing portion and the upper housing portion and for rotating the upper housing portion about a vertical shaft,
wherein the first bevel gear is integrated with one end of the hinge member,
wherein the hinge member includes:
a horizontal shaft having one end coupled to the first bevel gear;
a first cam fixed to the lower housing portion together with the other end of the horizontal shaft;
a second cam engaged with the first cam, for rotating about the horizontal shaft and straightly moving in a longitudinal direction of the horizontal shaft by a mutual cam operation with the first cam; and
an elastic unit for providing a restoring force against the straight movement of the second cam.

2. The twist-type mobile terminal as recited in claim 1, wherein each of the first and second bevel gears has a hollow part, respectively, such that a flexible printed circuit is passed through the hollow part to connect a display unit with a main printed circuit board PCB.

3. The twist-type mobile terminal as recited in claim 1, wherein the first bevel gear includes partially formed teeth within a rotation range of an folding operation and an unfolding operation of the upper housing portion and the lower housing portion.

4. The twist-type mobile terminal as recited in claim 1, wherein the first and second bevel gears have a gear ratio such that the second bevel gear is rotated in an angle of about 180 degrees with respect to the first bevel gear.

5. A twist-type mobile terminal, comprising:
a first body;
a second body foldable and unfoldable with respect to the first body; and
a hinge device having a first hinge for rotating the first body about a horizontal shaft and a second hinge for rotating the first body about a vertical shaft,
wherein the second hinge horizontally rotates the first body while the first hinge vertically rotates the first body,
wherein the second hinge includes a first bevel gear fixed to the first body, and a second bevel gear fixed to the second body and perpendicularly engaged with the first bevel gear,
wherein the first hinge includes:
a horizontal shaft having one end fixed to the first body;
a first cam disposed centered on the horizontal shaft and fixed to the first body;
a second cam adjacent to the fixed cam, for rotating on the horizontal shaft together with the hinge device and operating in a straight movement in a horizontal shaft direction by a mutual cam operation with the first cam; and
an elastic unit for providing a restoring force with respect to the straight movement of the second cam.

6. A hinge device for opening and closing a mobile communication terminal having first and second bodies, the second body openable and closable with respect to the first body, the device comprising:

a first hinge coupled to the first body and rotating the second body on a horizontal shaft; and a second hinge rotating the second body on a vertical shaft, wherein the second hinge twist-rotates the second body by a rotational force generated by the first hinge;

wherein the second hinge comprises:

a first bevel gear fixed to the first body; and a second bevel gear fixed to the second body and engaged with the first bevel gear such that lengthwise shafts of the first and second bevel gears are perpendicular to each other, wherein the second bevel gear is engaged with the first bevel gear to twist-rotate the second body while the first hinge lifts up or brings down the second body, wherein the first hinge comprises:

a horizontal shaft having one end fixed to the first body;

a first cam disposed centered on the horizontal shaft and fixed to the first body;

a second cam adjacent to the fixed cam, for rotating on the horizontal shaft together with the hinge device and operating in a straight movement in a horizontal shaft direction by a mutual cam operation with the first cam; and an elastic unit for providing a restoring force with respect to the straight movement of the second cam.

* * * * *